United States Patent Office 2,886,564
Patented May 12, 1959

2,886,564

QUATERNARY STEROIDAL ENAMINE SALTS

Roman P. Holysz, Kalamazoo Township, Kalamazoo County, Mich., assignor to The Upjohn Company, Kalamazoo, Mich., a corporation of Michigan No Drawing. Application March 24, 1955
Serial No. 496,625

9 Claims. (Cl. 260—239.5)

The present invention relates to steroidal quaternary ammonium compounds and is more particularly concerned with the quaternary steroidal enamine salts selected from the group consisting of 3-(N-quaternaryammonium)-3-pregnen-20-ones, 3 - (N - quaternaryammonium)-17-oxygenated-3-androstenes and 3-oxygenated-22-(N-quaternaryammonium)-bisnor - 20(22) - cholene salts wherein the quaternaryammonium radical is represented by the formula:

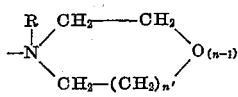

in which R is a lower alkyl radical containing less than eight carbon atoms and n and n' are whole numbers from 1 to 2, inclusive.

This application is a continuation-in-part of application S.N. 274,840 filed March 4, 1952, now U.S. Patent 2,752,368, issued June 26, 1956.

The 3-pregnen-20-one includes those 3-pregnen-20-ones which may incidentally possess other double bonds such as in position 1, 5(6), 9(11) or 16(17), hydroxy and acyloxy groups wherein the acyl group is of a hydrocarbon carboxylic acid containing from one to eight carbon atoms, especially in positions 6, 7, 11α and 11β, 14, 15, 17α and 21 or additional keto groups, whenever feasible, especially in positions 1, 6, 7, 11 or 16.

The 17-oxygenated-3-androstene includes, 17-oxygenated-3-androstenes which may additionally possess double bonds in positions such as 1, 5(6) or 9(11), hydroxy and acyloxy groups, defined as above, in positions 6, 7, 11α and 11β, 14, 15 or 16, or keto groups in positions 1, 6, 7, 11, 15 and 16. The 17-oxygenated steroid has at the 17-position hydroxy, acyloxy, wherein the acyl group is defined as above, or a keto.

3-oxygenated - bisnor - 20(22) - cholene includes those compounds which may additionally possess double bonds in positions 1, 4, 5(6) or 9(11), hydroxy and acyloxy groups wherein the acyloxy group is defined as above, and keto groups in positions 1, 3, 6, 7, 11, 15, or 16. The 3-position of the oxygenated steroid is substituted by hydroxy, acyloxy, wherein the acyl group is defined as above, or keto.

The process of the instant invention comprises treating a steroid enamine, which may be prepared by reacting a 3-keto steroid or a steroid 22-aldehyde with a secondary amine such as morpholine, pyrrolidine, piperidine, and the like, with an alkylation agent especially an alkyl halide having less than eight carbon atoms, such as methyl, ethyl, propyl, isopropyl, butyl, pentyl, hexyl or benzyl chloride, bromide or iodide, or with an ester such as dimethyl sulfate or diethyl sulfate, and recovering the thus-obtained quaternaryammonium α,β-unsaturated steroid salts. Other quaternaryammonium steroid salts can be prepared by converting a quaternary ammonium steroid halide, by treatment with an alkali base such as sodium hydroxide, to the corresponding quaternaryammonium base and reacting the thus-obtained quaternaryammonium base with an acid such as nitric, sulfuric, chloric, perchloric, formic, acetic, phosphoric, bromic, iodic, periodic, and the like, to produce the corresponding quaternaryammonium salt.

It is an object of the present invention to provide new quaternary steroidal ammonium salts selected from the group consisting of 3 - (N - quaternaryammonium) - 3 - pregnen-20-ones, 3 - (N - quaternaryammonium)-17-oxygenated-3-androstenes and 22-(N-quaternaryammonium) 3-oxygenated-bisnor-20(22)-cholene salts. A further object of the invention is the provision of a process for the production of such quaternary steroidal enamine salts. Other objects of the invention will be apparent to those skilled in the art to which the invention pertains.

The compounds of the present invention, 3-(N-quaternaryammonium)-3-pregnen-20-ones, 3-(N-quaternaryammonium)-17-oxygenated 3-antrostenes and 22-(N-quaternaryammonium)-3 - oxygenated - 20(22) - bisnorcholene salts are excellent wetting agents and have antibacterial activity, especially against *Staphylococcus aureus, S. albus, S. haemolyticus, Streptococcus fecalis, Bacillus subtilis, Escherichia coli, Aerobacter aerogenes, Salmonella typhosa,* dispar or Schottmuelleri, *Pseudomonas aeruginosa, Klebsiella pneumoniae, Proteus vulgaris, Saccharomyces cerevisiae,* and *Mycobacterium tuberculosis.* For this reason the compounds of the instant invention are suitable for topical use and particularly in the cleaning and sterilizing of surgical instruments or fomites. Additionally, these compounds are intermediates for the preparation of other useful complex compounds.

The compounds of this invention are suitable for electrocardiographic electrode jellies. It has been found that the use of glycerine and starch in these electrode jellies is superior and cheaper to gum tragacanth in the older jelly preparations. However, starch requires a preservative. The instant quaternaryammonium steroid compounds having antibacterial activity make it unnecessary to use additional bacteriostatic agents. Furthermore, the instant quaternaryammonium steroid compounds simultaneously function as electrolytes and enhance electrical conduction by reason of their wetting action.

The use of abrasives such as pumice [Lehning, J. Am. Pharm. Assoc. 9, pages 410–413 (1948)] in the electrocardiographic jellies, ordinarily required to scratch the horny layer of the epidermis and thus achieve better conduction thru the lower epidermis strata, is unnecessary when the instant quaternaryammonium steroids are used. A suitable composition of an electrocardiographic jelly thus prepared comprises:

| | Parts |
|---|---|
| Glycerol | 5 |
| Starch | 10 |
| Quaternaryammonium salt | 60 |
| Water | 100 |

The jelly is prepared by mixing the starch, glycerol and water and then adding the steroidal quaternary ammonium salt. The mixture is then allowed to stand for at least two days with occasional agitation to allow the formation of a gel.

In a similar manner a suitable composition of an electrocardiographic jelly is prepared by utilizing any of the above quaternaryammonium steroids in the following formulation:

Methyl cellulose (1500 c.p.s. viscosity):

| | Parts |
|---|---|
| 5 percent | 12.5 |
| Water, distilled | 250 |
| Steroidal quaternaryammonium salt | 200 |
| Glycerol | 15 |

The starting materials in this invention are 3-enamines of 3-keto steroids [cf. Heyl and Herr, J. Am. Chem. Soc. 75, pages 1918 and 5927 (1953)], and 22-enamines of steroid 22-aldehydes [Herr and Heyl, J. Am. Chem. Soc. 74, 3629 (1952)] and as further disclosed in Preparations 1 thru 8, inclusive. The preferred steroid enamines are selected from the group consisting of 3-(N-tertiaryamino)-3-pregnadien-20-ones, 3-(N-tertiaryamino)-17-oxygenated - 3 - androstenes and 22-(tertiaryamino)-3-oxygenated-bisnor-20(22)-cholen-22-als, wherein the terms 3-pregnen-20-ones, 17-oxygenated-3-androstenes and 3-oxygenated bisnor-20(22)-cholenes are defined as above, and wherein the tertiary amino radical is of the formula:

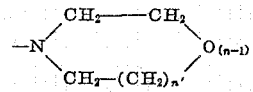

in which $n$ and $n'$ are whole numbers from 1 to 2, inclusive.

Representative starting materials comprise the following steroid enamines: 3-(N-pyrrolidino)-3,5-pregnadien-20 - one, 3-(N-pyrrolidino)-3,5-pregnadiene-11,20-dione, 3-(N-pyrrolidino)-3,5-pregnadien-11α-ol-20-one, 3 - (N-pyrrolidino)-3,5-pregnadien-11β-ol-20-one, 3-(N-pyrrolidino)-3,5-pregnadien-17α,21-diol-11,20-dione, 3 - (N-pyrrolidino)-3,5-pregnadien-21-ol-11,20-dione, 3-(N-pyrrolidino) - 3,5 - pregnadien-17α,21-diol-20-one, 3-(N-pyrrolidino)-3,5-pregnadiene-11β,17α,21-triol-20-one, 3-(N-pyrrolidino)-3,5-pregnadiene-11β,21-diol-20-one, 3 - (N-pyrrolidino)-3,5-pregnadien-21-ol-20-one, 3-(N-pyrrolidino)-3,5-pregnadiene - 1,3,5 - pregnatriene-11β,17α,21-triol-20-one, 3-(N-pyrrolidino)-3-pregnene-11,20-dione, 3-(N-pyrrolidino)-19-normethyl-3,5-pregnadien-20-one, 3-(N-morpholino)-2-allopregnene-11,20-dione, 3 - (N - pyrrolidino-3,5 - pregnadien-17α-ol-20-one, 3-(N-homomorpholino)-3,5-pregnadien-6β-ol-20-one, 3-(N-piperidino)-3,5-pregnadiene-14,17,21-triol-20-one, 3-(N-piperidino)-2-allopregnen-20-one, 3-(N-morpholino)-3,5-pregnadien-11β-ol-20-one, 3-(N-pyrrolidino) - 3,5 - androstadien-17-one, 3-(N-pyrrolidino)-10-normethyl-3,5-androstadien-17-ol, 3 - (N-pyrrolidino) - 3,5 - androstadien-11α-ol-17-one, 3-(N-pyrrolidino)-3,5-androstadien-11α,17β-diol, 3 - (N - pyrrolidino)-3,5-androstadien-11β,17β-diol, 3-(N - pyrrolidino)-3,5-androstadiene-11β,17β-diol 17β-acetate, 3-(N-pyrrolidino)-3,5-androstadien-11,17-dione, 3 - (N - pyrrolidino)-17α - methyl-3,5-androstadien-17β-ol, 3-(N-morpholino)-3,5 - androstadien - 17 - ol, 3-(N-homomorpholino)-3,5-androstadien - 14,17 - diol, 3 - (N-homomorpholino)-3,5-androstadien-17-ol-6-one, 3 - (N - piperidino)-3,5-androstadien-6β-ol-17-one, 3 - (N-piperidino)-3,5-androstadien-6α-ol-17-one 6α-acetate, 3-(N-pyrrolidino)-3,5-androstadien-17-ol-11-one, 22 - (N - piperidino)-bisnor-4,20(22)-choladien-3-one, 3-acetoxy-22-(N-piperidino)-bisnor-5,20-(22)-choladien, 3-hydroxy - 22 - (N-piperidino)-bisnor-5, 20(22) - choladien, 3-phenylacetoxy-22-(N-morpholino)-bisnor-5,20(22)-choladiene, 3 - acetoxy-22-(N-homomorpholino) - bisnor - 5,7,20(22) - cholatriene, 5,8-dimethyl maleate adduct, 3-acetoxy-9,11-oxido-22-(N-pyrrolidino)-bisnor-5,7,20(22)-cholatriene 5,8-dimethylmaleate adduct, and the like.

In carrying out the method of the present invention the selected starting compound, dissolved in a suitable organic solvent, such as benzene, ether, cyclohexene, pentane, hexane, heptane, dioxane, glycol ethers, and others, with ether or benzene being preferred is admixed with an alkylating agent, such as an alkyl halide wherein the alkyl group has less than eight carbon atoms and the halogen atom has an atomic weight between 34 and 130. Instead of using an inert organic solvent the selected enamine compound may be admixed and dissolved in the alkyl halide or alkyl sulfate itself. Suitable alkyl halides are the methyl, ethyl, propyl, isopropyl, butyl, pentyl, hexyl, heptyl, octyl, benzyl, allyl and propenyl chloride, bromide and iodide with methyl and ethyl bromide or iodide being preferred. Dialkyl sulfates such as dimethyl and diethyl sulfate, ethyl bromoacetate, benzoyl chloride, benzene sulfonyl chloride, toluenesulfonyl chloride, and the like can also be used to obtain a quaternary compound from the tertiaryamino compound. The preferred reagents, however, are the bromides and iodides of methyl, ethyl, propyl, and butyl. The temperature of the reaction may be between about zero and about the boiling temperature of the solvent employed, but a temperature between twenty and fifty degrees is preferably used with a range between zero and 100 degrees being suitable.

The reaction time depends on the temperature employed and varies for different reaction runs from half a day to 14 days at room temperature, while at higher temperatures, for example, between 40 to 80 degrees in benzene, a reaction time from about four hours to 24 hours is sufficient. Agitation, while not necessary, increases the rate of reaction and is therefore desirable. The solid compounds are usually isolated by filtration of the reaction mixture. If the product has been prepared by adding a solid enamine to a liquid alkyl halide, addition of a solvent such as ether is usually preferable before filtration. The precipitate thus obtained is purified by washing the crystals with ether or benzene. Further purification is achieved by recrystallization of the precipitate from mixtures of methanol and ethyl acetate or other solvents such as acetone, dioxane, Skellysolve hexanes, chloroform or water.

The following examples are illustrative of the process and products of the present invention, but are not to be construed as limiting.

PREPARATION 1

3-(N-morpholino)-3,5-pregnadien-11β-ol-20-one

11β-hydroxyprogesterone was admixed with morpholine and a catalytic amount of para-toluenesulfonic acid (about three percent of the weight of the starting steroid, 11β-hydroxy-progesterone) and heated for a period of four hours to reflux, eliminating the water from the reaction during the refluxing by means of a calcium carbide water trap. Thereafter the material was obtained by evaporating in vacuo the excess morpholine and recrystallizing the thus-obtained 3-(N-morpholino)-3,5-pregnadien-11β-ol-20-one from Skellysolve B (hexanes).

PREPARATION 2

3-(N-homomorpholino)-3,5-androstadien-17-ol-11-one

In a manner similar to Preparation 1, one gram of 11-keto-testosterone, dissolved in two milliliters of benzene and two milliliters of homomorpholine, was heated to reflux in the presence of para-toluenesulfonic acid, care being taken that the water of reaction was removed from the mixture. The thus-obtained 3-(N-homomorpholino)-3,5-androstadien-17-ol-11-one was recovered by filtration and purified by recrystallization.

In the same manner as Preparations 1 and 2, other 3,20 - diketopregnane and 3 - keto - 17 - oxygenated androstanes are reacted in the presence of an acidic catalyst with secondary cycloamines such as pyrrolidine, piperidine, morpholine, homomorpholine, 2-methyloxazolidine, trimethylenimine or even with non-cycloamines to produce starting compounds for the instant reaction such as illustratively: 3-(N-pyrrolidino)-3,5-pregnadien-17α,21-diol-11,20-dione, 3-(N-pyrrolidino)-3,5-pregnadien-21-ol-11,20-dione, 3-(N-pyrrolidino)-3,5-pregnadien-17α,21-diol-20-one, 3-(N-pyrrolidino)-3-pregnen-20-one, 3-(N-pyrrolidino)-3-pregnene-11,20-dione, 3-(N-pyrrolidino)-3,5-pregnadien-11β,17α,21-triol-20-one, 3-(N-pyrrolidino)3,5-pregnadien-11β,21-diol-20-one, 3-(N - pyrrolidino)-3,5-pregnadien-21-ol-20 - one, 3-(N-tetrahydroisoquinolino)-2-allopregnen-20-one, 3 - N - morpholino)-2-allopregnene-11,20-dione, 3-[N-(N-dicyclohexylamino)]-2-androsten-17-one, 3-[N,(N-dibenzylamino)]-3,5-pregnadien-20-one, 3 - [N - (N - methylanilino)]-3,5-pregnadien-20-one, 3-(N-piperidino)-3,5-androstadien-17-one, 3-[N-(N-ethylbenzylamino)]-3,5-androstadien-17-one, 3-(N-2-methyloxazolidino)-3,5-androstadien-17-one, 3-[N-(N-methylanilino)]-3,5-androstadien-17-one, 3-(N-oxazolidino)-3,5-androstadien-17-ol, 3-(N-morpholino)-3,5-androstadien-17-ol, 3 - (N-homomorpholino)-3,5-androstadien-17-ol, 3-(trimethylenimino)-3,5-androstadien-17-ol, 3-(N-pyrrolidino)-10-normethyl-3,5-androstadien-17-ol, 3-(N-pyrrolidino)-10-normethyl-3,5-androstadien-11,17-dione, and the like.

3-ketosteroids having a non-aromatic A ring and not belonging to the pregnane or androstane series may be converted to the corresponding enamines as described in Preparation 3.

PREPARATION 3

3-(N-piperidino)-3,5,22-stigmastatriene

A mixture of 4.11 grams of 3-keto-4,22-stigmastadiene, fifty milliliters of piperidine and forty milligrams of toluenesulfonic acid monohydrate were refluxed for a period of two and one-half hours. The water thus produced was trapped in a calcium carbide water trap. Thereafter the material was concentrated to dryness in vacuo to yield 4.9 grams of a yellow semisolid. The yellow semisolid, impure 3-(N-piperidino)-3,5,22-stigmastatriene, was purified by recrystallization from Skellysolve B (a mixture of hexanes), yielding white crystals of melting point 109 to 111 degrees centigrade.

*Analysis.*—Calculated for $C_{34}H_{55}N$: N, 2.93. Found: N, 3.17.

Rotation $[\alpha]_D$ —56 degrees in chloroform.

Otherwise like Example 3, by reacting 3-ketosteroids having non-aromatic A rings with secondary amines such as dialkylamines, dicycloalkylamines, dialkanoylamines, diaralkylamines, alkylaralkylamines and especially cyclic amines such as piperidine, pyrrolidine, homomorpholine, morpholine, trimethylenimine, oxazolidine, other steroid 3-enamines suitable for the production of quaternary-amines are prepared, such as 3-(N-oxazolidino)-3-etiocholene-17-one, 3-[N-(N-diethylamino)]-3,5-cholestadiene, 3-[N-(N-dibutylamino)]-3,5-cholestadiene, 3-(N-pyrrolidino)-3,5-cholestadiene, 3-(N-pyrrolidino)-3,5,22-stigmastatriene, and the like.

PREPARATION 4

22-(N-pyrrolidino)-bisnor-4,20(22)-choladien-3-one

A mixture of two grams of bisnor-4-cholen-3-one-22-al, 35 milliliters of benzene and three milliliters of pyrrolidine was heated under reflux in an atmosphere of nitrogen for one hour in the presence of para-toluenesulfonic acid. The solvent was then removed by distillation at subatmospheric pressure to obtain a light-colored crystalline solid. A small portion of the crystalline residue was washed with ether and its physical characteristics were determined and found to correspond to those of the starting bisnor-4-cholen-3-one-22-al. The remainder of the crystalline mixture was dissolved in 35 milliliters of toluene and three milliliters of pyrrolidine and heated under reflux in an atmosphere of nitrogen for an additional four and one half hours in a still provided with a water trap. The solvent was thereafter removed by distillation at atmospheric pressure leaving crystals of 22-(pyrrolidino)-bisnor-4,20(22)-choladien-3-one.

PREPARATION 5

3-acetoxy-22-(N-homomorpholino)-bisnor-5,7,20(22)-cholatrien 5,8-dimethyl maleate adduct 3-acetoxy-bisnor-5,7-choladien-22-al 5,8-dimethyl maleate adduct was refluxed for a period of six hours in benzene with a solution of homomorpholine [Braun et al., Ber. 54B, 685 (1921)] and para-toluenesulfonic acid. The water formed during the reaction was removed by a water trap connected to the reflux condenser. Thereafter the mixture was condensed under vacuum and the crystals remaining in the reaction flask were repeatedly recrystallized from benzene to give pure 3-acetoxy-22-(N-homomorpholino) - bisnor - 5,7,20(22)-cholatrien 5,8-dimethyl maleate adduct.

In a manner similar to Preparations 4 and 5, by reacting a 3-oxygenated bisnorcholan-22-al with a cyclic amine, such as piperidine, pyrrolidine, morpholine, homomorpholine, 2-methyloxazolidine, trimethylenimine, or with another secondary amine such as dialkylamine, dicycloalkylamine, alkyl aralkylamine, dialkanoylamine or diaralkylamine other 3-oxygenated-22-(N-tertiary-amino)-bisnor-20(22)-cholene are prepared such as 22-(N-pyrrolidino)-bisnor-4,20(22)-choladien-3-one, 22-(N-homomorpholino)-bisnor-4,20(22)-choladien-3-one, 22-(N-trimethylenimino)-bisnor-4,20(22)-choladien - 3 - one, 22 - (N - tetrahydroisoquinolino) - bisnor-4,20(22)-choladien-3-one, 3-acetoxy-9(11)-oxido-22-(N - pyrrolidino)-bisnor-5,7,20(22)-cholatrien 5,8-dimethyl maleate adduct, 3-phenylacetoxy-22-(N-morpholino)-bisnor - 4,20-(22) - choladien, 22-(tetrahydroisoquinolino)-bisnor-20-(22) - cholen - 3 - one 22-[N-(N-dicyclohexylamino)]-3β-methoxy - bisnor - 20(22) - cholen, 22-[N-(N-didodecyl-amino)]-3α-naphthoyloxy-bisnor-20(22) - cholen, 3-hydroxy-22-(N-2-methyloxazolidino)-bisnor-5,20(22) - choladien, 22-(N-pyrrolidino)-20(22)-cholen-3-one, 5,8-diethyl maleate adduct of 3-acetoxy-22-[N-(N-diethanolamino)]-bisnor-5,7,20(22)-cholatrien, and the like.

It is also possible to use dienamine steroids as starting material for the preparation of di-(N-quaternaryammonium) steroid salts such as 3,17-di-(N-pyrrolidino)-3,5,16-androstatrien-11-one and 3,17-di-(N-pyrrolidino)-3,5,16-androstatrien-11β-ol [Herr et al., J. Am. Chem. Soc. 75, 5927 (1953)]. Other such 3,17-dienamines can be prepared from 11-oxygenated androstane-3,17-dione and similarly 3,22-dienamines can be prepared from 3-keto-bisnorcholan-22-als as shown in the following preparations.

PREPARATION 6

3,17-di-(N-morpholino)-3,5,16-androstatrien-11α-ol

A mixture of 11α-hydroxy-4-androstene-3,17-dione was refluxed with four mole equivalents of morpholine and para-toluenesulfonic acid. The water produced during this reaction was absorbed by a calcium carbide tube attached to the reflux condenser. After refluxing for a period of four hours the reaction mixture was distilled in vacuo and the solids thus obtained were recrystallized from Skellysolve-ethyl acetate mixtures to give pure 3,17-di-(N-morpholino)-3,5,16-androstatrien-11α-ol.

In a manner similar to Preparation 6, by heating 4-androstene-3,17-dione oxygenated in the 11-position, such as the 11α- or 11β-hydroxy-4-androstene-3,17-diones, the 11α-esters thereof, the 11 keto analog thereof or the 11α-alkyloxy-4-androstene-3,17-dione with an excess of a secondary amine such as a dialkylamine, a dialkoxyamine, a diaralkylamine, an aralkylalkylamine, a dicycloamine or cyclic amines such as piperidine, trimethylenimine, morpholine, homomorpholine, pyrrolidine, tetrahydroisoquinoline, 2-methyloxazolidine, other 3,17-di-(N-tertiaryamino)-3,16-androstadien compounds oxygenated in the 11 position are prepared such as illustratively: 3,17-di - (N-homomorpholino) - 3,5,16-androstatrien - 11α-ol, 3,17 - di - (N-morpholino) - 3,5,16 - androstatrien - 11α-acetoxy, 3,17-di - (N-morpholino)3,5,16 - androstatrien - 11α-phenylacetoxy, 3,17-di-[N-(N-dihexylamino)]-3,5,16-androstatrien-11α-ol, 3,17-di-[N - (N - dimethylamino)]-3,5,16-androstatrien - 11-one, 3,17 - di - [N - (N - methylanilino)]-3,5,16-androstatrien - 11 - one, 3,17-di-[N-(N-dicyclohexylamino)]-3,5,16-androstatrien - 11 - one, 3,17-di - (N-piperidino)-3,5,16 - androstatrien-11-one, 3,17-di-(N-2 - methyloxazolidino)-3,5,16 - androstatrien-11-one, 3,17-di-(N - tetrahydroisoquinolino)-3,5,16-androstatrien-11-one, 3,17-di-(N-piperidino)-3,5,16-androstatrien - 11β-ol, 3,17-di-[N-(N-dibenzylamino)]-3,5,16 - androstatrien-11β-ol, 3,17-di-(N-pyrrolidino)-3,5,16-androstatrien-11β- ol, 3,17 - di-[N-(N-methylanilino)]-3,5,16-androstatrien-11β-ol, 3,17-di-(N-pyrrolidino) - 10 - normethyl - 3,5,16 - androstatrien-11-one, 3,17-di - [N-(N-dibutylamino)]-10-normethyl-3,5,16-androstatrien-11β-ol, and the like.

PREPARATION 7

*3-(N-pyrrolidino)-22-(N-piperidino)-bisnor-3,5,20(22)-cholatrien*

22-(N-piperidino) - bisnor - 4,20(22) - choladien-3-one [Herr and Heyl, J. Am. Chem. Soc. 74, 3627 (1952)] was refluxed for one hour with pyrrolidine in excess and a catalytic amount (three percent of the weight of the steroid) of para-toluenesulfonic acid. The mixture was then concentrated to dryness in vacuo using ordinary precautions to preclude moisture. The product was triturated with methanol and recovered by filtration. Recrystallization from acetone gave a pure product of 3-(N-pyrrolidino)-22-(N-piperidino)-bisnor-3,5,20(22)-cholatriene of melting point 126 to 130 (dec.) degrees centigrade.

In a similar manner by heating a 22-(N-tertiaryamino)-bisnor-20(22)-cholen-3-one with a secondary amine such as dialkylamines, dicycloalkylamines, aralkyl alkylamines, diaralkylamines and cycloamines such as trimethylenimine, tetraisoquinoline, morpholine, homomorpholine, pyrrolidine, piperidine, oxazolidine in the presence of an acid catalyst other steroid-3,22 mixed dienamines may be prepared such as: 3-(N-pyrrolidino) - 22 - (N-morpholino)-bisnor - 3,5,20(22) - cholatrien, 3-(N-pyrrolidino) - 22-(N-oxazolidino) - bisnor-3,5,20(22) - cholatrien, 3 - (N-pyrrolidino) - 22 - (N-tetrahydroisoquinolino)3,5,20(22)-cholatrien, 3-(N-pyrrolidino)-22-[N-(N-dimethylamino)]bisnor-3,5,20(22) - cholatrien, 3-(N-pyrrolidino)-22 - [N-(N-dibutylamino)]-bisnor-3,5,20(22)-cholatrien, 3 - (N-pyrrolidino) - 22 - [N - (N-dicyclohexylamino)] - bisnor-3,5,20(22)-cholatrien, 3-(N-pyrrolidino)-22 - [N - diethano-amino)] - bisnor - 3,5,20(22) - cholatrien, 3 - (N-pyrrolidino)-22-[N-(N-dibenzylamino)] - bisnor-3,5,20(22)-cholatrien, 3-(N-pyrrolidino)-22-[N-(N-methylanilino)]-bisnor - 3,5,20(22)-cholatrien, 3-(N - piperidino) - 22-(N-pyrrolidino)-bisnor-3,5-20(22)-cholatrien, 3-(N-morpholino)-22-(N-piperidino)-bisnor-3,5,20(22) - cholatrien, 3-[N - (N - dipropylamino)] - 22 - (N-piperidino) - bisnor-3,5,20(22)-cholatrien, 3-[N-(N-dicyclohexylamino)]-22-(N-piperidino) - bisnor - 3,5,20(22)-cholatrien, 3-[N-(N-dibenzylamino)]-22 - [N - (N - methylanilino)] - bisnor-3,20(22)-choladien, 3-[N-(N-diethanolamino)] - 22-[N-(N-dibutylamino)]-bisnor - 3,20(22) - choladien, and the like.

PREPARATION 8

*3,22-(N,N'-dipiperidino)-bisnor-3,5,20(22)-cholatrien*

3-keto-bisnor-4-cholen-22-al, dissolved in benzene, was refluxed with four mole equivalents of piperidine and paratoluenesulfonic acid for four hours. Thereafter the excess benzene and piperidine was removed by distillation in vacuo. The remaining crystals were recrystallized from methyl alcohol to give 3,22-(N,N'-dipiperidino)-bisnor-3,5,20(22)-cholatrien of melting point 198-200 degrees centigrade and α_D—70 degrees.

In a manner similar to Preparation 8, by reacting the corresponding 3-ketobisnorcholan-22-al with a secondary amine selected from dialkylamines, dicycloalkylamines, diaralkylamines, alkylaralkylamines, and cyclic amines such as piperidine, morpholine, tetrahydroisoquinoline, homomorpholine, oxazolidine, pyrrolidine and trimethylenimine in the presence of an acid catalyst, other 3,22-dienamines of the corresponding 3-keto-bisnorcholan-22-als are prepared such as: 3,22 - (N,N' - dipyrrolidino)-bisnor-3,5,20(22)-cholatrien, 3,22-(N,N'-dimorpholino)-bisnor-3,5,20(22)-cholatrien, 3,22-(N,N'-dioxazolidino)-bisnor-3,5,20(22)-cholatrien, 3,2 - (N,N'-ditetrahydroisoquinolino)-bisnor - 3,5,20(22) - cholatrien, 3,22 - (N,N'-dihomomorpholino)-bisnor-3,5,20(22) - cholatrien, 3,22-[N,N'-di-(N-dibenzylamino)]-bisnor-3,5,20(22) - chola-trien, 3,22 - [N,N' - di-(N-diethylamino)]-bisnor-3,5,20(22)-cholatrien, 3,22-[N,N'-di-(N-dibutylamino)]-bisnor-3,5,20(22) - cholatrien, 3,2,2 - [N,N'-di-(N-di-dodecylamino)]-bisnor-3,5,20(22)-cholatrien, 3,22-(N,N'-di-(N-methyl-N-benzylamino)]-bisnor-3,5,20(22)-cholatrien, 9-(11) - oxido - 3,22-[N,N'-di-(N-methylanilino)]-bisnor-3,5,7,20(22)-cholatetraene 5,8-dimethyl maleate adduct, 3,22 - [N,N' - di - (N-diethanolamino)]-bisnor-3,5,7,20-(22)-cholatetraene 5,8-maleic anhydride adduct, 3,22-(N,N'-dipyrrolidino)-bisnor-3,22-choladien-11-one, 3,22-(N,N' - dipiperidino)-bisnor-3,5,22-cholatrien-11-one, 3,22-[N,N' - (morpholine)] - bisnor-3,5,22-cholatrien-11α-ol, 3,22 - [N,N' - (oxazolidino)] - bisnor-3,5,22-cholatrien-11α - acetoxy, 3,22 - (N,N'-dimorpholino)-bisnor-3,5,22-cholatrien - 11β - ol, 3,22-(N,N'-tetrahydroisoquinolino)-bisnor-1,3,5,20(22)-cholatetraen-11β-ol, and the like.

EXAMPLE 1

*N - (3,5-androstadien-17β-ol-3-yl)-N-methylpyrrolidinium iodide (testosterone pyrrolidinyl enamine methiodide)*

A mixture of 3.3 grams of 3-(N-pyrrolidino)-3,5-androstadien-17β-ol [Heyl et al., J. Am. Chem. Soc. 75, 1918 (1953)], twenty milliliters of benzene and 2.5 milliliters of methyl iodide was maintained in the dark in a nitrogen atmosphere for a period of ten days. Thereafter the mixture was filtered and gave 3.4 grams of a tan solid which was recrystallized from a mixture of methanol and ethyl acetate in equal amounts to give flat yellow prisms of N-(3,5-androstadien-17β-ol-3-yl)-N-methylpyrrolidinium iodide of melting point 230 to 235; $[\alpha]_D + 27$ degrees $$\lambda_{max}^{ethanol}\ 224\ (23,450)$$

*Anal.*—Calcd. for $C_{24}H_{38}INO$: C, 59.62; H, 7.92; I, 29.25; N, 2.90. Found: C, 59.53; H, 8.00; I, 26.55.

EXAMPLE 1A

*N-(3,5-androstadiene-17β-one-3-yl)-N-methylpyrrolidinium nitrate*

One gram of N-(3,5-androstadiene-17β-one-3-yl)-N-methylpyrrolidinium iodide, dissolved in fifteen milliliters of ethanol was treated with excess of an alcoholic sodium hydroxide solution until a drop sample showed basic to phenolphthalein. The solution was then diluted with water, cooled and filtered yielding a precipitate of N-(3,5-androstadien-17β-ol-3-yl)-N-methylpyrrolidinium hydroxide.

One fifth of a gram of N-(3,5-androstadien-17β-ol-3-yl)-N-methylpyrrolidinium hydroxide was dissolved in four milliliters of ethanol and neutralized with dilute nitric acid. Thereafter the solvents ethanol and water were removed by vacuum distillation and the product N - (3,5 - androstadien - 17β - one - 3 - yl) - N - methylpyrrolidine nitrate, was purified by recrystallization from methanol.

In the same manner adding to N-(3,5-androstadien-17β-ol-3-yl)-N-methylpyrrolidinium hydroxide amounts of acid calculated on the basis of one acid hydrogen atom per mole of N-(3,5-androstadien-17β-ol-3-yl)-N-methylpyrrolidinium hydroxide such as hydrochloric, dilute hydrobromic, dilute sulfuric, dilute chloric, iodic, perchloric, periodic, formic, acetic or trichloroacetic acid and the like acids, the chloride, bromide, bisulfite, chlorate, iodate, perchlorate, periodate, formate, acetate, trichloroacetate of N-(3,5-androstadiene-17β-ol-3-yl)-N - methylpyrrolidinium are obtained.

EXAMPLE 2

*N-(3,5-androstadiene-17α-methyl-17β-ol-3-yl)-N-methylpyrrolidinium bromide*

In a manner similar to Example 1, 3-(N-pyrrolidino)-3,5-androstadiene-17α-methyl-17β-ol [Heyl et al., J. Am. Chem. Soc. 75, 1918 (1953)], dissolved in benzene, was allowed to react with methyl bromide during a period of seven days at room temperature in a sealed ampule to give N-(3,5-androstadiene-17α-methyl-17β-ol-3-yl) - N-methylpyrrolidinium bromide.

EXAMPLE 3

N-(3,5-androstadien-17-one-3-yl)-N-ethyl-pyrrolidinium iodide

In a manner similar to Example 1, 3-(N-pyrrolidino)-3,5-androstadien-17-one [Heyl et al., J. Am. Chem. Soc. 75, 1918 (1953)], dissolved in benzene, was allowed to react with ethyl iodide during a period of seven days at room temperature to give N-(3,5-androstadien-17-one-3-yl)-N-ethylpyrrolidinium iodide.

EXAMPLE 4

N-(3,5-androstadien-11α-ol-17-one-3-yl)-propyl-pyrrolidinium iodide

In a manner similar to Example 1, 3-(N-pyrrolidino)-3,5-androstadien-11α-ol-17-one [Herr et al., J. Am. Chem. Soc. 75, 5927 (1953)], dissolved in benzene, was allowed to react with propyl iodide during a period of seven days at room temperature to give N-(3,5-androstadien-11α-ol-17-one-3-yl)-N-propylpyrrolidinium iodide.

EXAMPLE 5

N-(3,5-androstadien-11,17-dione-3-yl)-N-butyl-pyrrolidinium iodide

In a manner similar to Example 1, 3-(N-pyrrolidino)-3,5-androstadiene-11,17-dione [Herr et al., J. Am. Chem. Soc. 75, 5927 (1953)], dissolved in benzene, was allowed to react with butyl iodide during a period of seven days at room temperature to give N-(3,5-androstadien-11,17-dione-3-yl)-N-butylpyrrolidinium iodide.

EXAMPLE 6

N-(3,5-androstadiene-11β,17β-diol-3-yl)-N-benzyl-pyrrolidinium bromide

In a manner similar to Example 1, 3-(N-pyrrolidino)-3,5-androstadiene-11β,17β-diol [Herr et al., J. Am. Chem. Soc. 75, 5927 (1953)], dissolved in benzene, was allowed to react with benzyl bromide during a period of seven days at room temperature to give N-(3,5-androstadiene-11β,17β-diol-3-yl)-N-benzylpyrrolidinium bromide.

EXAMPLE 7

N-(3,5-pregnadien-20-one-3-yl)-N-methyl-pyrrolidinium iodide

Two and one-half grams (2.5 grams) of N-(pyrrolidino)-3,5-pregnadien-20-one [Heyl et al., J. Am. Chem. Soc. 75, 1918 (1953)] was dissolved in ten milliliters of warm (45 degrees centigrade) benzene. To this solution was added 1.5 milliliters of methyl iodide. After being stirred for a period of sixteen hours at room temperature the solution was filtered and the precipitate was washed with benzene and ether and recrystallized from ethyl acetate and methanol to give 2.1 grams of N-(3,5-pregnadien-20-one-3-yl)-N-methylpyrrolidinium iodide of melting point 208 to 214 degrees centigrade, $[\alpha]_D+89$ degrees centigrade.

Anal.—Calcd. for $C_{26}H_4OINO$: C, 61.29; H, 7.91; I, 24.91; N, 2.75. Found: C, 60.95; H, 7.90; I, 25.21; N, 3.13.

EXAMPLE 8

N-(3,5,22-stigmastatrien-3-yl)-N-methyl-pyrrolidinium iodide

A solution of 2.32 grams of 3-(N-pyrrolidino)-3,5,22-stigmastatrien [J. Am. Chem. Soc. 75, 1918 (1953)], dissolved in 75 milliliters of benzene was allowed to stand for a period of 48 hours at room temperature (20 to 30 degrees centigrade) in the absence of light and air with 2.84 grams of methyl iodide. The yellow gelatinous precipitate which formed was separated, washed with benzene and dried. 1.40 grams of N-(3,5,22-stigmasta-trien-3-yl)-N-methylpyrrolidinium iodide of melting point 225 to 230 degrees centigrade was obtained. Rotation $[\alpha]_D+8$ degrees (c 0.905 in chloroform);

$\lambda^{alc.}_{max}$ 222.5, 279 mmu

Anal.—Calculated for $C_{34}H_{56}IN$: I, 20.95. Found: I, 22.7, 23.9.

EXAMPLE 9

N-(3,5,22-stigmastatrien-3-yl)-N-methyl-piperidinium iodide

Three hundred milligrams of 3-(N-piperidino)-3,5,22-stigmastatrien (from Preparation 1) was allowed to stand at room temperature with three milliliters of methyl iodide for a period of three days in the absence of light and air. Thereafter the mixture was diluted with 25 milliliters of ether and filtered. The thus obtained yellow solid was dried in vacuo giving a yield of 420 milligrams of N-(3,5,22-stigmastatrien-3-yl)-N-methylpiperidinium iodide of melting point 191 to 195 degrees centigrade. Rotation $[\alpha]_D$—74 degrees.

Anal.—Calculated for $C_{35}H_{58}IN$: I, 20.5. Found: I, 18.6, 19.4, 18.7, 19.4.

EXAMPLE 10

N-(3,5-pregnadiene-11,20-dione-3-yl)-N-isopropyl-pyrrolidinium iodide

In a manner similar to Example 7, 3-(N-pyrrolidino)-3,5-pregnadiene-11,20-dione [Heyl et al., J. Am. Chem. Soc. 75, 1918 (1953)], dissolved in benzene was allowed to react with isopropyl iodide during a period of eight days at room temperature to give N-(3,5-pregnadiene-11,20-dione-3-yl)-N-isopropylpyrrolidinium iodide.

EXAMPLE 11

N-(3,5-pregnadien-11α-ol-20-one-3-yl)-N-butylpyrroli-dinium chloride

In a manner similar to Example 7, 3-(N-pyrrolidino)-3,5-pregnadien-11α-ol-20-one [Heyl et al., J. Am. Chem. Soc. 75, 1918 (1953)], dissolved in benzene was allowed to react with butyl chloride during a period of eight days at room temperature to give N-(3,5-pregnadien-11α-ol-20-one-3-yl)-N-butylpyrrolidinium chloride.

EXAMPLE 12

N-(3,5-pregnadien-11β-ol-20-one-3-yl)-N-ethyl-morpholinium bromide

In a manner similar to Example 7, 3-(N-morpholino-3,5-pregnadien-11β-ol-20-one (Preparation 2) dissolved in benzene, was allowed to react with ethyl bromide during a period of eight days at room temperature to give N - (3,5 - pregnadien - 11β - ol-20-one-3-yl)-N-ethylmor-pholinium bromide.

EXAMPLE 13

N-(3,5-cholestadien-3-yl)-N-hexylpyrrolidinium chloride

In a manner similar to Example 7, 3-(N-pyrrolidino)-3,5-cholestadiene [Heyl et al., J. Am. Chem. Soc. 75, 1918 (1953)], dissolved in benzene was allowed to react with hexyl chloride during a period of eight days at room temperature to give N-(3,5-cholestadien-3-yl)-N-hexylpyrrolidinium chloride.

EXAMPLE 14

N-(3-cholesten-3-yl)-N-butylpyrrolidinium bromide

In a manner similar to Example 7, 3-(N-pyrrolidino)-

3-cholestene [Heyl et al., J. Am. Chem. Soc. 75, 1918 (1953)], dissolved in benzene was allowed to react with butyl bromide during a period of eight days at room temperature to give N-(3-cholesten-3-yl)-N-butylpyrrolidinium bromide.

EXAMPLE 15

*N-(3,5-pregnadien-20-one-3-yl)-N-dimethylanilinium bromide*

In a manner similar to Examples 2 and 7, 3-[N-(N-methylanilino)]3,5 - pregnadiene (Preparation 3), dissolved in benzene was allowed to react with methyl bromide during a period of eight days at room temperature to give N-(3,5-pregnadien-20-one-3-yl)-N-dimethylanilinium bromide.

EXAMPLE 16

*Preparation of other 3-quaternaryammonium α,β-unsaturated steroid salts*

The following 3-(N-3-quaternaryammonium)-α,β-unsaturated steroid salts can be prepared in a manner essentially as described hereinbefore.

(a) N-(3,5-pregnadiene - 17α,21 - diol-11,20-dione-3-yl)-N-methylpyrrolidinium iodide by reacting 3-(N-pyrrolidino) - 3,5 - pregnadiene-17α,21-diol-11,20-dione with methyl iodide.

(b) N-(3,5-pregnadiene - 11β,17α,21 - triol-20-one-3-yl)-N-methylpyrrolidinium iodide by reacting 3-(N-pyrrolidino)-3,5-pregnadiene - 11β,17α,21 - triol-20-one with methyl iodide.

(c) N-(3,5-pregnadiene - 17α,21 - diol-20-one-3-yl)-N-methylpyrrolidinium iodide by reacting 3-(N-pyrrolidino) - 3,5 - pregnadiene-17α,21-diol-20-one with methyl iodide.

(d) N-(3,5-pregnadiene - 11β,21 - diol-20-one-3-yl)-N-methylpyrrolidinium iodide by reacting 3-(N-pyrrolidino)-3,5-pregnadiene - 11β,21 - diol-20-one with methyl iodide.

(e) N-(3,5-pregnadien - 21 - ol-11,20-dione-3-yl)-N-methylpyrrolidinium iodide by reacting 3-(N-pyrrolidino) - 3,5 - pregnadien - 21-ol-11,20-dione with methyl iodide.

(f) N-(3,5 - pregnadien-21-ol-20-one-3-yl)-N-methylpyrrolidinium iodide by reacting 3-(N-pyrrolidino)-3,5-pregnadien-21-ol-20-one with methyl iodide.

(g) N-(2-allopregnene - 11,20 - dione-3-yl)-N-butylmorpholinium bromide by reacting 3-(N-morpholino)-2-allopregnene-11,20-dione with butyl bromide.

(h) N-(3,5 - androstadien - 17 - one-3-yl)-N-ethyl-2-methyloxazolidinium iodide by reacting 3-(N-oxazolidino)-3,5-androstadien-17-one with ethyl iodide.

(i) N-(3,5-androstadien - 17 - one-3-yl)-N-diethyl-N-benzylammonium bromide by reacting 3-[N-(N-ethylbenzylamino)]-3,5-androstadien-17-one with ethyl bromide.

(j) N-3,5-androstadien - 17 - one-3-yl)-N-methyl-N-diethanolammonium iodide by reacting 3-[N-(N-diethanolamino)] - 3,5 - androstadien-17-one with methyl iodide.

(k) N-(3,5 - androstadien - 17 - one-3-yl)-N-methylpiperidinium iodide by reacting 3-(N-piperidino)-3,5-androstadien-17-one with methyl iodide.

(l) N-(3,5-androstadien - 17 - one-3-yl)-N-methyl-N-dicyclopentylammonium iodide by reacting 3-[N-(N-dicyclopentylamino)]-3,5-androstadien-17-one with methyl iodide.

(m) N - (3,5 - androstadiene - 17 - one - 3 - yl) - N-methyltetrahydroisoquinolinium iodide by reacting 3-(N-tetrahydroisoquinolino)-3,5-androstadiene - 17 - one with methyl iodide.

(n) N - (3,5 - androstadiene - 17 - one - 3 - yl) - N-dimethylanilinium iodide by reacting 3-[N-(N-methylanilino)]-3,5-androstadien-17-one with methyl iodide.

(o) N - (3 - etiocholen - 17 - one - 3 - yl) - N - methyl-2-methyloxazolidinium bromide by reacting 3-(N-2-methyloxazolidino)-3-etiocholen-17-one with methyl bromide.

(p) N - (3,5 - andostradiene - 17 - methoxy - 3 - yl)-N-methylpyrrolidinium iodide by reacting 3-(N-pyrrolidino)-3,5-androstadiene-17β-methoxy with methyl iodide.

(q) N - (3,5 - androstadiene - 17 - ethoxy) - N - ethylmorpholinium bromide by reacting 3-(N-morpholino)-3,5-androstadien-17β-ethoxy with ethyl bromide.

(r) N - (10 - normethyl - 3,5 - androstadien - 17 - ol)-N-methylpyrrolidinium iodide by reacting 3-(N-pyrrolidino)-10-normethyl-3,5-androstadien-17-ol with methyl iodide.

(s) N - (10 - normethyl - 3,5 - androstadiene - 11,17-dione)-N-methylpyrrolidinium iodide by reacting 3-(N-pyrrolidino) - 10 - normethyl - 3,5 - androstadien - 11,17-dione with methyl iodide.

EXAMPLE 17

*N - (bisnor - 4,20(22) - choladien - 3 - one - 22 - yl) - N-methylpiperidinium iodide*

A solution of 7.92 grams of 22-(N-piperidino)-4,20(22)-bisnor-choladien-3-one [Herr et al., J. Am. Chem. Soc. 74, 3627 (1952)], suspended in twenty milliliters of ether was admixed with twenty milliliters of methyl iodide. The mixture was allowed to stand at room temperature for a period of three days in the absence of light and air. Thereafter the mixture was diluted with an equal volume of ether and the precipitate, crude N-(bisnor-4,20(22)-choladien-3-one-22-yl)-N-methylpiperidinium iodide, thus obtained was separated by filtration and recrystallized from Skellysolve B (hexanes). The melting point of N-(bisnor - 4,20(22) - choladien - 3 - one - 22 - yl) - N-methylpiperidinium iodide was 194–197 degrees centigrade, rotation $[\alpha]_D+51$ degrees (C, 1.04 in chloroform).

*Analysis.*—Calculated for $C_{28}H_{44}INO$: I, 23.6. Found: I, 27.5, 26.2.

By reacting, as shown in Example 1A, N-(bisnor-4, 20(22)-choladien-3-one-22-yl)-N-methylpiperidinium iodide with sodium hydroxide and treating the thus obtained N-(bisnor-4,20(22)-choladien-3-one-22 - yl) - N - methylpiperidinium hydroxide with an equivalent amount of an acid such as, hydrochloric, hydrobromic, chloric, perchloric, nitric, sulfuric, periodic, phosphoric, acetic, chloroacetic, trichloroacetic, formic, or the like, the corresponding salts, i.e., chloride, bromide, chlorate, perchlorate, nitrate, bisulfate, periodate, dihydrogen-phosphate, acetate, chloroacetate, trichloroacetate, formate or the like of N - (bisnor - 4,20(22)-choladien-3-one-22-yl)-N-methyl-piperidinium are obtained.

EXAMPLE 18

*N-(bisnor-4,20(22)-choladien-3-one-22-yl)-N-(n-butyl)-piperidinium bromide*

A solution of 0.5 gram of 22-(N-piperidino)-4,20(22)-bisnorcholadien-3-one, dissolved in two milliliters of benzene, was admixed with one milliliter of normal butyl bromide. The mixture was permitted to stand at room temperature (twenty to thirty degrees centigrade) for a period of five days. The resulting gelatinous precipitate was separated by filtration, the precipitate washed with one milliliter of benzene and dried. Recrystallized from ethyl acetate and methanol the N-(bisnor-4,20(22)-choladien-3-one-22-yl)-N-(n-butyl)-piperidinium bromide had a decomposition point of 238 to 241 degrees centigrade.

EXAMPLE 19

*N-(bisnor-4,20(22)-choladien-3-one-22-yl)-N-methylmorpholinium iodide*

In the manner shown in Examples 17 and 18, 22-(N-morpholino)-bisnor-4,20(22)-choladien-3-one [Herr et al., J. Am. Chem. Soc. 74, 3627 (1952)] was treated with methyl iodide and allowed to stand at room temperature (twenty to thirty degrees centigrade) for a period of five days to yield N-(bisnor-4,20(22)-choladien-3-one-22-yl)-N-methylmorpholinium iodide.

EXAMPLE 20

*N-(bisnor-4,20(22)-choladien-3-one-22-yl)-N-methyltetrahydroisoquinolinium iodide*

In the manner shown in Examples 17 and 18, 22-(N-tetrahydroisoquinolino)-bisnor - 4,20(22) - choladien - 3- one was treated with methyl iodide to yield N-(bisnor-4,20(22)-choladien-3-one-22-yl) - N - methyltetrahydroisoquinolinium iodide.

EXAMPLE 21

*N-(bisnor-4,20(22)-choladien-3-one-22-yl)-N-methyl-2-methyloxazolidinium iodide*

In the manner shown in Examples 17 and 18, 22-(N-oxazolidino)-bisnor-4,20(22)-choladien-3-one was treated with methyl iodide to yield N-(bisnor-4,20(22)-choladien-3-one-22-yl)-N-methyl - 2 - methyloxazolidinium iodide.

EXAMPLE 22

*N-(bisnor-4,20(22)-choladien-3-one-22-yl)-N-methyl-N-dicyclohexylammonium iodide*

In the manner shown in Examples 17 and 18, 22-(N-dicyclohexylamino)-bisnor-4,20(22)-choladien-3-one was treated with methyl iodide to yield N-(bisnor-4,20(22)-choladien-3-one-22-yl)-N-methyl-N - dicyclohexylammonium iodide.

EXAMPLE 23

*N-(bisnor-4,20(22)-choladien-3-one-22-yl)-N-methyl-N-dibenzylammonium iodide*

In the manner shown in Examples 17 and 18, 22-(N-dibenzylamino)-bisnor-4,20(22)-choladien - 3 - one was treated with methyl iodide to yield N-(bisnor-4,20(22)-choladien-3-one-22-yl)-N-methyl-N - dibenzylammonium iodide.

EXAMPLE 24

*N-(bisnor-4,20(22)-choladien-3-one-22-yl)-N-methyl-N-homomorpholinium iodide*

In the manner shown in Examples 17 and 18, 22-(N-homomorpholinium-bisnor-4,20(22)-choladien-3-one was treated with methyl iodide to yield N-(bisnor-4,20(22)-choladien-3-one-22-yl)-N-methyl-N - homomorpholinium iodide.

EXAMPLE 25

*N-(bisnor-4,20(22)-choladien-3-one-22-yl)-N-methyl-N-diethanolammonium iodide*

In the manner shown in Examples 17 and 18, 22-(N-diethanolamino)-bisnor-4,20(22)-choladien - 3 - one was treated with methyl iodide to yield N-(bisnor-4,20(22)-choladien-3-one-22-yl)-N-methyl-N - diethanolammonium iodide.

EXAMPLE 26

*N-(bisnor-5,20(22)-choladien-3β-ol-22-yl)-N-ethyl-piperidinium bromide*

In a manner similar to Examples 17 and 18, 22-(N-piperidino)-bisnor-5,20(22)-choladien-3β-ol [Herr et al., J. Am. Chem. Soc. 74, 3627 (1952)] was treated with ethyl bromide to yield N-(bisnor-5,20(22)-choladien-3β-ol-22-yl)-N-ethylpiperidinium bromide.

EXAMPLE 27

*N-(bisnor-5,20(22)-choladien-3β-ol-22-yl-3-acetate)-N-methylpiperidinium chloride*

In a manner similar to Examples 17 and 18, 22-(N-piperidino)-bisnor-5,20(22)-choladien-3β-ol - 3 - acetate [Herr et al., J. Am. Chem. Soc. 74, 3627 (1952)] was reacted with methyl chloride to yield N-(bisnor-5,20(22)-choladien-3β-ol-22-yl-3-acetate) - N - methylpiperidinium chloride.

EXAMPLE 28

*N-(bisnor-4,20(22)-choladien-3-one-22-yl)-N-trimethylammonium bromide*

In a manner similar to Examples 17 and 18, 22-[N-(N-dimethylamino)]-bisnor-4-20(22)-choladien-3 - one was reacted with methyl bromide to yield N-(bisnor-4,20(22)-choladien-3-one-22-yl)-N-trimethylammonium bromide.

EXAMPLE 29

*N-(bisnor-4,20(22)-choladien-3-one-22-yl)-N-methyl-N-dibutylammonium bromide*

In a manner similar to Examples 17 and 18, 22-[N-(N-dibutylamino)]-bisnor - 4,20(22) - choladien-3-one was reacted with methyl bromide to yield N-(bisnor-4,20(22)-choladien-3-one-22-yl)-N-methyl - N - dibutylammonium bromide.

EXAMPLE 30

*N-(3-acetoxy-bisnor-5,7,20(22) - cholatrien 5,8 - dimethyl maleate adduct-22-yl)-N-isopropyl-N - diethanolammonium bromide*

In a manner similar to Examples 17 and 18, 3-acetoxy-22-(N-diethanolamino)-bisnor-5,7,20(22) - cholatriene 5,8-dimethyl maleate adduct was reacted with isopropyl bromide to yield N-(3-acetoxybisnor-5,7,20(22)-cholatriene 5,8-dimethyl maleate adduct-22-yl)-N-isopropyl-N-diethanolammonium bromide.

EXAMPLE 31

*N-(3-acetoxy-9(11)-oxido-bisnor-5,7,20(22) - cholatriene 5,8-dimethyl maleate adduct-22-yl)-N-benzyl-N-methyl-anilinium bromide*

In a manner similar to Examples 17 and 18, 5,8-dimethyl maleate adduct of 3-acetoxy-9(11)-oxido-22-(N-methylanilino)-bisnor-5,7,20(22)-cholatriene was reacted with benzyl bromide to yield N-(3-acetoxy-9(11)-oxido-bisnor-5,7,20(22)-cholatriene 5,8-dimethyl maleate adduct-22-yl)-N-benzyl-N-methylanilinium bromide.

EXAMPLE 32

*N-(3-phenylacetoxy-bisnor-5,20(22)-choladien-22-yl)-N-hexylmorpholinium bromide*

In a manner similar to Examples 17 and 18, 3-phenylacetoxy-22-(N-morpholino)-bis-5,20(22)-choladiene was reacted with hexyl bromide to yield N-(3-phenylacetoxy-bisnor-5,20(22)-choladiene-22-yl)-N - hexylmorpholinium bromide.

In a manner similar to Examples 17 through 32, by the reaction of 22-steroid enamines and alkyl halides, other 22-quaternary-ammonium α,β-unsaturated steroid salts may be prepared such as: N-(bisnor-20(22)-cholen-3 - one - 22 - yl) - N - isopropyltetrahydroisoquinolinium iodide, N - (bisnor - 20(22) - cholene - 3β - methoxy-22 - yl) - N - ethyl - N - dicyclohexylammonium bromide, N - (bisnor - 20(22) - cholen - 3α - naphthoyloxy - 22-yl) - N - methyl - N - didodecylammonium iodide, N- (bisnor - 5,20(22) - choladiene - 22 - yl) - N - octyl - 2-methyloxazolidinium iodide, N-(bisnor-20(22)-cholen-3-ol - 22 - yl) - N - pentylpyrrolidinium iodide, N - (bisnor - 5,7,20(22) - cholatriene - 3 - acetoxy 5,8 - maleic anhydride adduct 22-yl)-N-ethyl-N-diethanol ammonium chloride, and the like.

By using the reactions described in Example 1A, the chlorates, perchlorates, iodates, periodates, dihydrogen phosphates, nitrates, bisulfates, acetates, formates, chloroacetates, trichloroacetate, and the like of the above listed quaternaryammonium compounds are obtained.

Example 33

N,N'-(3,5,16-androstatrien-11-one-3,17-di-yl)-bis-
(N-methylpyrrolidinium) di-iodide

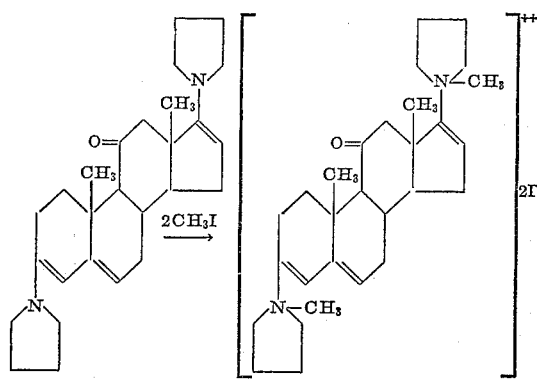

One gram of 3,17 - di - (N - pyrrolidino) - 3,5,16-androstatrien-11-one [Herr et al., J. Am. Chem. Soc. 75, 5927 (1953)] was dissolved in four milliliters of ether and thereto was added two milliliters of methyl iodide. The mixture was permitted to stand for a period of seven days at room temperature (twenty to thirty degrees centigrade), and thereafter the mixture was filtered. The thus-obtained precipitate was recrystallized to give purified N,N'-(3,5,16-androstatrien-11-one-3,17-di-yl)-bis-(N-methylpyrrolidinium) di-iodide.

Example 34

N,N'-(3,5,16-androstatrien-11β-ol-3,17-di-yl)-bis-
(N-ethylpyrrolidinium) bromide In the manner shown in Example 33, reacting 3,17-di-(N - pyrrolidino) - 3,5,16 - androstatrien - 11β - ol [Herr, J. Am. Chem. Soc. 75, 5927 (1953)] with ethyl bromide, N,N' - (3,5,16 - androstatrien - 11β - ol - 3,17 - di - yl)-bis-N-ethylpyrrolidinium bromide is obtained.

In a manner similar to Examples 33 and 34 by reacting 11-oxygenated-Δ³,¹⁶-steroid dienamines with an alkyl halide other representative 3,17-diquaternaryammonium α,β-unsaturated steroid enamines are obtained, such as: N,N'-(3,5,16 - androstatrien - 11α - ol - 3,17 - di - yl) - bis - (N-propylmorpholinium) bromide, N,N' - (3,5,16 - androstatrien - 11α - acetoxy - 3,17 - di - yl) - bis - (N - propylmorpholinium) bromide, N,N'-(3,5,16-androstatrien-11α-phenylacetoxy - 3,17 - di - yl) - bis - (N - propylmorpholinium) bromide, N,N'-(3,5,16-androstatrien-11α-methoxy - 3,17 - di - yl) - bis - (N - propylmorpholinium) bromide, N,N' - (3,5,16 - androstatrien - 11 - one - 3,17 - di - yl) - bis - (N - trimethylammonium) di - iodide, N,N' - (3,5,16 - androstatrien - 11 - one - 3,17 - di - yl)-bis - (N -methyltetrahydroisoquinolinium) di - iodide, N,N' - (3,5,16 - androstatrien - 11 - one - 3,17 - di - yl)-bis - (N -ethyl - 2 - methyloxazolidinium) di - iodide, N,N' - (3,5,16 - androstatrien - 11 - one - 3,17 - di - yl)-bis - (N - methylanilinium) dibromide, N,N' - (3,5,16-androstatrien - 11 - one - 3,17 - di - yl) - bis - (N - methyl-N-dicyclohexylammonium) dibromide, N,N'-(3,5,16-androstatrien - 11β - ol - 3,17 - di - yl) - bis - (N - hexylpiperidinium) dibromide, N,N' - (3,5,16 - androstatrien-11β - ol - 3,17 - di - yl) - bis - (N - ethyl - N - dibenzylammonium) di - iodide, N,N' - (3,5,16 - androstatrien-11β - ol - 3,17 - di - yl) - bis - (N - dimethylanilinium) di-iodide, N,N' - (3,5,16 - androstatrien - 11α - ol - 3,17-di - yl) - bis - (N - trihexylammonium) di - iodide, N,N' - (3,5,16 - androstatrien - 11α - ol - 3,17 - di - yl)-bis - (N - methyl - N - diethanolammonium) di - iodide, N,N' - (10 - normethyl - 3,5,16 - androstatrien - 11 - one-3,17 - di - yl) - bis - (N - methyl - N - pyrrolidinium) dibromide, N,N' - (10 - normethyl - 3,5,16 - androstatrien-11β - ol - 3,17 - di - yl) - bis - (N - propyl) - N - dibutylammonium chloride.

Example 35

N,N' - (bisnor - 3,5,20(22) - cholatrien - 3,22 - di - yl)-
3 - (N - methylpyrrolidinium) - 22 - (N - methylpiperidinium) di-iodide

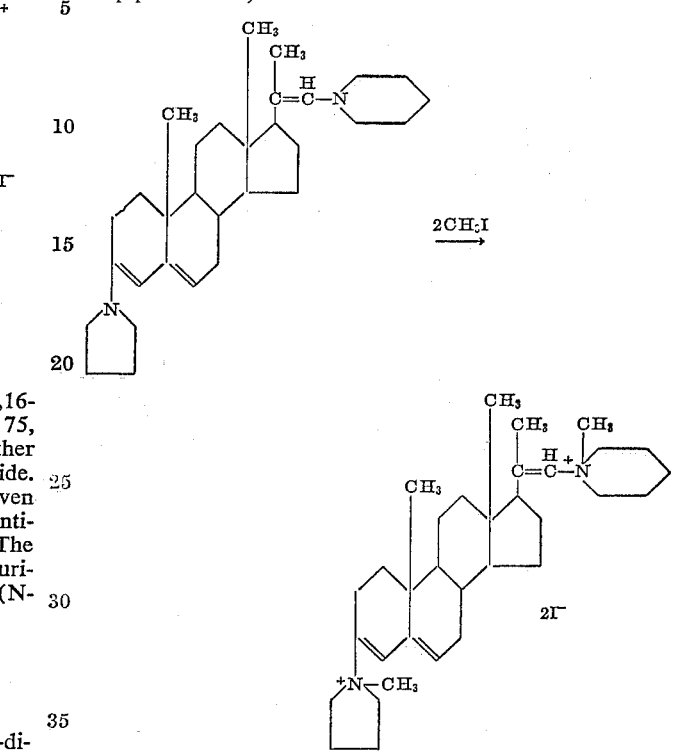

3 - (N - pyrrolidino) - 22 - (N - piperidino) - bisnor-3,5,20(22) - cholatrien (Preparation 7), dissolved in benzene, was treated with methyl iodide and allowed to stand for a period of ten days. Thereafter the mixture was filtered and the precipitate thus obtained was recrystallized from Skellysolve B (hexanes) to give purified N,N'-(bisnor - 3,5,20(22) - cholatrien - 3,22 - di - yl) - 3 - (N-methylpyrrolidinium) - 22 - (N - methylpiperidinium) di-iodide.

In a manner similar to Example 35, by reacting mixed 3,22-steroid enamines prepared as described in Preparation 7, with an alkyl halide, other di- or poly unsaturated diquaternary bisnor-cholane compounds are prepared such as: N,N'-(bisnor-3,5,20(22)-cholatrien-3,22-di - yl) - 3 - (N - methylpyrrolidinium) - 22 - (N - methylmorpholinium) dibromide, N,N'-(bisnor-3,5,20(22)-cholatrien - 3,22 - di - yl) - 3 - (N - ethylpyrrolidinium) - 22 - (N - ethyloxazolidinium) dibromide, N,N' - (bisnor - 3,5,20(22) - cholatrien - 3,22 - di - yl) - 3 - N - ethylpyrrolidinium - 22 - (N - ethyltetrahydroisoquinolinium) dibromide, N,N' - (bisnor - 3,5,20(22) - cholatrien-3,22 - di - yl) - 3 - (N - propylpyrrolidinium) - 22 - (N-propyl - N - dimethylammonium) di - iodide, N,N'-(bisnor - 3,20(22) - choladien - 3,22 - di - yl) - 3 - (N-butyl) - 22 - (N - diethanolammonium) di-iodide, N,N'-(bisnor - 3,20(22) - choladien - 3,22 - di - yl) - 3 - (N-methyl - N - dibenzylammonium) - 22 - (N - dimethylanilinium) di - iodide, N,N' - (bisnor - 3,20(22) - choladien - 3,22 - di - yl) - 3 - (N - ethyl - N - dibenzylammonium) - 22 - (N - ethyl - N -methylanilinium) di-iodide, N,N' - (bisnor - 3,20(22) - choladien - 3,22 - di-yl) - 3 - (N - hexyl - N - dibenzylammonium) - 22 - (N-hexyl-N-methylanilinium) di-iodide, and the like.

Example 36

N,N'-(bisnor-3,5,20(22)-cholatrien-3,22-di-yl)-bis-
(N-methylpiperidinium) di-iodide In the manner given in Example 35, 3,22-(N,N-dipiperidino)-bisnor-3,5,20(22)-cholatrien (Preparation 8)

was treated with methyl iodide to give N,N'-(bisnor-3,5,20(22)-cholatrien-3,22-di-yl) - bis - (N-methylpiperidinium) di-iodide.

EXAMPLE 37

*N,N'-(bisnor-3,5,20(22)-cholatrien-3,22-di-yl)-bis-(N-ethylpyrrolidinium) dibromide*

In the manner given in Example 35, 3,22-(N,N'-dipyrrolidino)-bisnor-3,5,20(22)-cholatrien (Preparation 8) was treated with ethyl bromide to give N,N'-(bisnor-3,5,20(22)-cholatrien-3,22-di-yl) - bis - (N - ethylpyrrolidinium) dibromide.

Following the procedures given in Examples 35 thru 37, by reacting bisnor-3,22-choladien-3,22-dienamines with alkyl halides, a great variety of other N,N'-(bisnor-3,22-choladien-3,22-di-yl)-bis-(quaternaryammonium) dihalides are obtained, such as: N,N'-bisnor-3,5,20(22)-cholatrien-3,22-di-yl) - bis - (N - propyl - N - dibenzylammonium) di-iodide, N,N'-(bisnor-3,5,20(22)-cholatrien-3,22-di-yl)-bis-(N-butyl-N-diethylammonium) dibromide, N,N'-(bisnor-3,5,20(22) - cholatrien - 3,22-di-yl)-bis-(N-pentyl-N-dibutylammonium) dibromide, N,N'-bisnor-3,5,20(22)-cholatrien-3,22-di-yl)-bis-(N-hexyl - N-didodecylammonium) dibromide, N,N'-(bisnor-3,5,20(22)-cholatrien-3,22-di-yl)-bis-(N-methylmorpholinium) dibromide, N,N'-(bisnor-3,5,20(22) - cholatrien - 3,22-di-yl)-bis-(N-methyl-2-methyloxazolidinum) dibromide, N,N'-(bisnor-3,5,20(22)-cholatrien-3,22-di-yl) - bis - (N - dimethyl-N-benzylammonium) di-iodide, N,N'-(bisnor-3,5,7,20(22)-cholatetraene-9(11)-oxido-5,8-dimethyl maleate adduct 3,22-di-yl)-bis-(N-dimethylanilinium) dibromide, N,N'-(bisnor-3,5,7,20(22)-cholatetraene 5,8-diethyl maleate adduct - 3,22 - di - yl)-bis-(N - benzyl-N-diethanolammonium) dibromide, N,N'- (bisnor - 3,22 - choladien - 11-one-3,22-di-yl)-bis-(N-methylpyrrolidinium)-di-iodide, N,N'-(bisnor-3,5,22-cholatrien - 11 - one - 3,22 - di-yl)-bis-(N-methylpiperidinum) dibromide, N,N' - (bisnor - 3,5,22-cholatrien-11α-ol-3,22-di-yl)-bis - (N-triethylammonium) dibromide, N,N'-(bisnor-3,5,22-cholatrien - 11α - acetoxy-3,22-di-yl)-bis-(N-propyl-N-dibenzylammonium) dichloride, N,N'- (bisnor - 3,5,22 - cholatrien-11β-ol-3,22-di-yl)-bis-(N-butyl-morpholinium) di-iodide, N,N'-(bisnor-1,3,5,20(22)-cholatetraen-11β-ol-3,22-di-yl) - bis - (N-hexyltetrahydroisoquinolinium) dibromide, and the like.

Using the procedure of Example 1A, the chlorates, iodates, nitrates, perchlorates, acetates, chloroacetates, trichloroacetates, formates, bisulfates, dihydrogen phosphates and the like of the above-listed quaternaryammonium bisnorcholadienes are obtained.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A quaternaryammonium steroid salt selected from the group consisting of 3-(N-quaternaryammonium)-3-pregnen-20-one, 3-(N-quaternaryammonium)-17-oxygenated-3-androstene and 3-oxygenated-22-(N-quaternaryammonium)-bisnor-20(22)-cholene salts wherein the quaternaryammonium radical is represented by the formula:

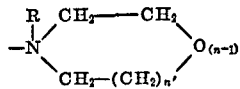

in which R is a lower alkyl radical containing less than eight carbon atoms, n and n' are whole numbers from 1 to 2, inclusive, and wherein the anionic part of the salt molecule is a halide having an atomic weight between 34 and 130 and wherein the oxygenated group on the 17- and 3- positions is selected from the group consisting of hydroxy, acyloxy wherein the acyl radical is of a hydrocarbon carboxylic acid containing from one to eight carbon atoms, and keto.

2. 3-(N-quaternaryammonium)-3,5-pregnadien-20-one halide wherein the halide has an atomic weight between 34 and 130 and wherein the quaternaryammonium radical is represented by the formula:

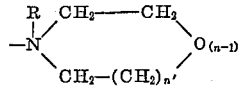

in which R is a lower alkyl radical containing less than eight carbon atoms, n and n' are whole numbers from 1 to 2, inclusive.

3. N-(3,5-pregnadien-20 - one - 3 - yl)-N-methylpyrrolidinium iodide.

4. N-(3,5-pregnadien-11β-ol-20-one-3-yl)-N - ethylmorpholinium bromide.

5. 3-(N-quaternaryammonium)-17β-oxygenated-3,5-androstadien halide wherein the halogen atom has an atomic weight between 34 and 130 and wherein the quaternaryammonium radical is represented by the formula:

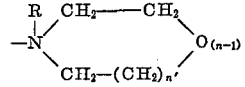

in which R is a lower alkyl radical containing less than eight carbon atoms, n and n' are whole numbers from 1 to 2, inclusive, and wherein the anionic part of the salt molecule is a halide having an atomic weight between 34 and 130 and wherein the oxygenated group on the 17-position is selected from the group consisting of hydroxy, acyloxy wherein the acyl radical is of a hydrocarbon carboxylic acid containing from one to eight carbon atoms, and keto.

6. N-(3,5-androstadien-17β-ol-3-yl)- N - methylpyrrolidinium iodide.

7. N-(3,5-androstadien-11,17-dione-3-yl)- N - butylpyrrolidinium iodide.

8. 22-(N-quaternaryammonium)-bisnor-4,20(22)- choladien-3-one halide wherein the halogen atom has an atomic weight between 34 and 130 and wherein the quaternaryammonium radical is represented by the formula:

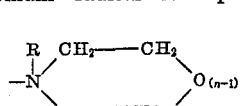

in which R is a lower alkyl radical containing less than eight carbon atoms, n and n' are whole numbers from 1 to 2, inclusive.

9. N - (bisnor - 4,20(22) - choladien - 3 - one-22-yl)-N-methylpiperidinium iodide.

References Cited in the file of this patent

UNITED STATES PATENTS

| | | |
|---|---|---|
| 2,252,863 | Raymond | Aug. 19, 1941 |
| 2,752,368 | Holysz | June 26, 1956 |

OTHER REFERENCES

Herr: J. Am. Chem. Soc., pages 3627–30, July 20, 1952.

Heyl: J. Am. Chem. Soc., pages 1918–20, vol. 75, April 20, 1953.

Herr: J. Am. Chem. Soc., Dec. 5, 1953, vol. 75, pages 5927–30.